July 16, 1940.  R. A. WEAGANT  2,207,906

RADIO DETECTOR

Filed May 11, 1938

INVENTOR
ROY A. WEAGANT
BY
ATTORNEY

Patented July 16, 1940

2,207,906

UNITED STATES PATENT OFFICE 2,207,906

RADIO DETECTOR

Roy A. Weagant, Douglaston, Long Island, N. Y., assignor to Radio Corporation of America, a corporation of Delaware Application May 11, 1938, Serial No. 207,193

6 Claims. (Cl. 250—27)

My present invention relates to rectifiers generally, but in particular to a rectifier having a characteristic whose slope is less for a range of large input voltages than for lesser voltages.

An object of the invention is to obtain, from a single rectifier tube, a direct voltage for automatic volume control of a preceding amplifier, and detection of modulated radio frequency current, with a detection characteristic which is relatively flat for strong signal input voltages.

Figure 1:
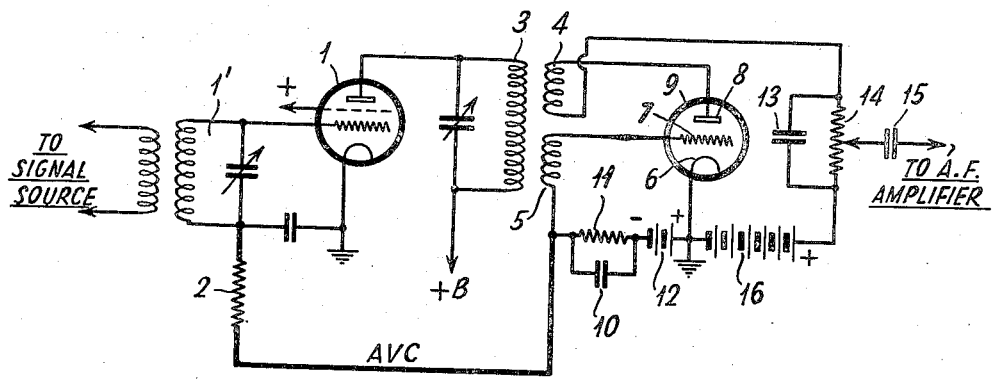
Fig. 1 shows an arrangement in accordance with the invention.

Referring to Fig. 1, tube 1 is an amplifier of radio frequency signals impressed on its tuned input circuit 1' by a signal source not shown. The tuned output coil 3 of tube 1 is coupled to coil 5 connected in the grid circuit of detector tube 9, and, with like polarity, to coil 4 in the plate circuit of 9. A load resistance 11 is included in the grid circuit of tube 9 and the grid return of tube 1 is connected through filter resistor 2 to the negative end of load resistor 11 so that direct voltage produced by rectification of signal current in the grid circuit of tube 9 is impressed on the grid of tube 1 to control its amplification in accordance with the input signal level impressed on detector 9. A source of D. C. potential 12 is also connected in the grid circuit of tube 9 with its negative terminal towards the grid 7 to provide a threshold level below which rectification does not occur in the grid circuit. The numeral 10 denotes the usual R. F. by-pass condenser across load 11.

In the plate circuit of tube 9 a load resistance 14, shunted by R. F. by-pass condenser 13, is connected in series with a source of D. C. voltage 16 whose positive terminal is toward plate 8. Preferably the voltage of source 16 is equal to the voltage of source 12 multiplied by the amplification factor of the tube. With this adjustment the action of the circuit on weak signals is as follows: so long as the peak voltage across coil 5 is less than the voltage of bias source 12 no current flows in the grid circuit of tube 9 and the plate circuit behaves as though the tube were a diode with an impressed R. F. voltage equal to the voltage of coil 4 plus the voltage of coil 5 multiplied by the amplification factor of the tube. With suitably large values of resistance 14 and condenser 13, this results in a direct voltage across resistance 14 which is substantially equal to the total effective peak voltage applied in the plate circuit. That is, the voltage across 14 is approximately $E_p + \mu E_g$, where $E_p$ is the peak voltage across coil 4, $E_g$ is the peak voltage across coil 5, and $\mu$ is the amplification factor of the tube.

For signals in the range where $E_g$ is greater than the voltage of source 12, however, the action is substantially different. With suitably large values of condenser 10 and resistor 11, the instantaneous potential of grid 7 swings to substantially zero on the positive peak of each wave, regardless of the amplitude of the wave so long as $E_g$ is greater than the voltage of source 12. Hence, at the peak of the voltage wave applied in the plate circuit, the voltage applied, $E_p$, minus the drop across resistor 14 plus the voltage of source 16 must add up to a very small positive value to be consistent with the drawing of only a small amount of plate current at each positive wave peak. Hence the voltage across resistor 14 must be approximately equal to $E_p$ plus the voltage of source 16. The rate of change of the voltage across resistor 14 with respect to variation of signal intensity is thus smaller than in the case of weak signals in the ratio $E_p$ to $(E_p + \mu E_g)$. Roughly speaking, it may be said that for weak signals such that no grid circuit reactification occurs, the signal voltage applied in the grid circuit is effectively transferred, with a multiplication in effectiveness $\mu$, to the plate circuit with the result that the plate circuit rectification is greatly improved for weak signals, while for strong signals the voltage impressed on the grid produces its own rectification and leaves the plate circuit rectification to its own devices. Thus not only is the input voltage to the detector held back by automatic volume control action, but the output of the detector is also limited to a much more gradual increase with signals of large amplitude. The ratio of $E_p$ to $E_g$ may be varied to obtain the best results for any particular purpose. The foregoing discussion has been directed to direct currents produced by unmodulated signals, but in case of modulation of any sort the variation of the direct current through resistance 14 constitutes a modulation frequency voltage which is transferred through a blocking condenser 15 to any desired form of utilization circuit as indicated by the legend in Fig. 1.

Figure 2:
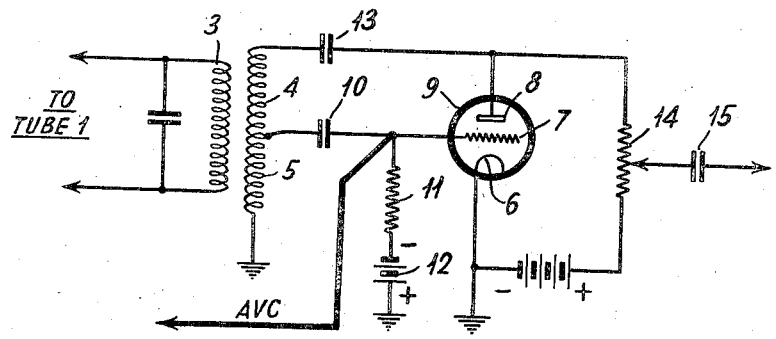
Fig. 2 shows an alternative form of the arrangement of Fig. 1.

The circuit of Fig. 2 differs from that shown in Fig. 1 only in that the load resistances 11 and 14 are each connected across both its corresponding by-pass condenser, 10 or 13, and also across the R. F. voltage input. This modification is well known per se in detector circuits, and need not be further described. The advantage of the arrangement of Fig. 2 is that a single input coil divided by a tap point into sections 4 and 5 may be used, instead of separate coils 4 and 5 insulated from each other as in Fig. 1. The action of Fig. 2 is in all other respects the same as explained in connection with Fig. 1.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. A rectifier circuit comprising in combination an electron discharge tube having a cathode and two auxiliary electrodes so arranged in a single electron stream from the cathode that electron flow to one of said electrodes is strongly influenced by the potential of the other electrode, an external load circuit connected between each of said electrodes and cathode thereby to provide a pair of rectifier circuits, means for applying solely unrectified high frequency alternating voltage in each of said rectifier circuits, means for applying a positive direct voltage to one of said electrodes, and a utilization device connected to one of said load circuits.

2. A rectifier circuit comprising in combination an electron discharge tube having a cathode and two auxiliary electrodes so arranged that electron flow to one of said electrodes is strongly influenced by the potential of the other electrode, an external load circuit connected between each of said electrodes and cathode thereby to provide a pair of rectifier circuits, means for applying solely unrectified high frequency alternating voltage in each of said rectifier circuits, means for applying a positive direct voltage to one of said electrodes, means for applying a negative potential to the other of said electrodes, and a utilization device connected to one of said load circuits.

3. A rectifier circuit as defined in claim 2, wherein said negative potential means has a magnitude such as substantially to cut off the flow of current to the electrode at the positive potential.

4. A rectifier circuit for supplying automatic volume control potential and audio frequency currents from a modulated wave, comprising in combination an electron discharge tube having a cathode and two auxiliary electrodes so arranged that electron flow between said cathode and one of said electrodes is strongly influenced by the potential of the other of said electrodes, an audio output circuit and a source of positive direct voltage connected between said cathode and said one electrode, a load circuit including a resistance and a source of negative potential connected between cathode and said other electrode, means for applying solely unrectified modulated waves to said two electrodes, and a circuit connected to said last named load circuit for utilizing direct potentials thereacross.

5. In combination, in a radio receiver, a detector tube provided with at least a cathode, an output electrode and a control grid therebetween, a modulated carrier voltage input circuit connected between the grid and cathode and including a load impedance in circuit for developing a unidirectional voltage from rectified carrier voltage, a second modulated carrier voltage input circuit connected between the output electrode and cathode and including a second load impedance in circuit therewith, means establishing said output electrode at a positive potential relative to the grid and cathode, and independent voltage utilization circuits connected to said load impedances.

6. In combination, in a radio receiver, a detector tube provided with at least a cathode, an output electrode and a control grid therebetween, a modulated carrier voltage input circuit connected between the grid and cathode and including a load impedance in circuit for developing a unidirectional voltage from rectified carrier voltage, means for establishing said grid at a negative potential relative to cathode, a second modulated carrier voltage input circuit connected between the output electrode and cathode and including a second load impedance in circuit therewith, means establishing said output electrode at a positive potential relative to the grid and cathode, and independent voltage utilization circuits connected to said load impedances.

ROY A. WEAGANT.